United States Patent [19]

Halbe et al.

[11] Patent Number: 4,677,689

[45] Date of Patent: Jun. 30, 1987

[54] CIRCUIT ARRANGEMENT FOR AN APPARATUS WITH A PICTURE AND/OR SOUND CHANNEL

[75] Inventors: Manfred Halbe, Hüttenberg; Hans J. Grambow, Wetzlar, both of Fed. Rep. of Germany

[73] Assignee: U.S. Philips Corporation, New York, N.Y.

[21] Appl. No.: 730,878

[22] Filed: May 6, 1985

[30] Foreign Application Priority Data

Aug. 3, 1984 [DE] Fed. Rep. of Germany ....... 3428698

[51] Int. Cl.⁴ ............................................... H04B 1/16

[52] U.S. Cl. .................................... 455/181; 455/186; 455/194; 455/249

[58] Field of Search ............... 455/181, 186, 194, 249; 358/114

[56] References Cited

U.S. PATENT DOCUMENTS 4,348,696 9/1982 Beier .................................. 358/114

4,484,027 11/1984 Lee et al. ........................... 358/114

OTHER PUBLICATIONS

Nakamichi, Mobile Sound System, 2/1983, p. 3.

*Primary Examiner*—Jin F. Ng

*Assistant Examiner*—Elissa Seidenglanz

*Attorney, Agent, or Firm*—Thomas A. Briody; Jack Oisher; William J. Streeter

[57] ABSTRACT

The invention relates to a circuit arrangement for a home-entertainment apparatus which, by means of a memory and a timer, ensures that the apparatus can operate correctly only if a date has been entered. If this is not the case, the timer will disable the apparatus after a specific time interval.

5 Claims, 5 Drawing Figures

CIRCUIT ARRANGEMENT FOR AN APPARATUS WITH A PICTURE AND/OR SOUND CHANNEL

FIELD OF THE INVENTION

The invention relates to a circuit arrangement for an apparatus with a picture and/or sound channel, which comprises a muting stage for increasing the signal attenuation.

BACKGROUND OF THE INVENTION

When home-entertainment equipment, such as a radio or TV receiver, a record player or a recorder, is sold, it is generally accompanied with a guarantee that within a specific period after the sale, defective equipment will be repaired free of charge. The bill or a separate guarantee certificate then serves proof for this guarantee. However, these documents may be mislaid or altered.

OBJECT AND SUMMARY OF THE INVENTION

It is the object of the invention to provide a possibility of ascertaining the date of first use.

Starting from a circuit arrangement of the type specified in the opening paragraph, this object is achieved in that there is provided a non-volatile date memory which can be programmed by the user of the apparatus and, coupled thereto, a timer which can be set by switching on the supply voltage of the apparatus, and the date memory and the timer cause the muting stage to increase the signal attenuation after a predetermined time interval defined by the timer if the memory has not been programmed, whilst the muting stage is not influenced by the timer if the memory has been programmed.

If the date of putting into operation has been entered or programmed into the date memory, the apparatus will function normally. However, if the date memory has not been programmed, the timer is set when the apparatus is switched on and after a preset time determined by the timer—generally a few minutes—the muting stage is actuated so that the sound and/or picture practically disappear(s). Normal operation may then be restored by switching off and subsequently switching on the apparatus, but this renders the apparatus practically useless. Therefore, the user is forced to enter the date at which the apparatus is put into operation for the first time and thus program the date memory. By means of this date memory, which forms part of the apparatus, it can then be ascertained whether the guarantee period has already expired.

Since the timer allows a short period of operation, final inspection during manufacture or pre-sale testing at the dealer remains possible.

Such a circuit arrangement is not expensive because the only additional parts are a date memory and a timer, which can be manufactured comparatively cheaply; a muting stage for increasing the signal attentuation is already present in some or other form in most apparatuses.

A date memory can be constructed in various manners: In a first embodiment the date memory comprises an input and an output terminal which are interconnected via at least one conductor arranged on a board and, for severing the conductor, the board is formed with a plurality of holes at the location of the conductor, which holes correspond to various dates. The date is then stored mechanically in that the conductor or the conductors are severed at the location of the holes corresponding to the date of putting into operation.

In another embodiment the date memory is an electrical non-volatile digital memory, which can be programmed by means of an input unit via a digital control device, and the control device is constructed so that if the memory has not been programmed the timer is set when the power supply is switched on and causes the attenuation of the muting stage to increase when a predetermined time interval has elapsed. In this case a digital electronic memory is employed, for example a PROM or the like.

Embodiments of the invention will now be described in more detail, by way of example, with reference to the drawings. In the drawings

DESCRIPTION OF THE PREFERRED EMBODIMENT

Figure 1:
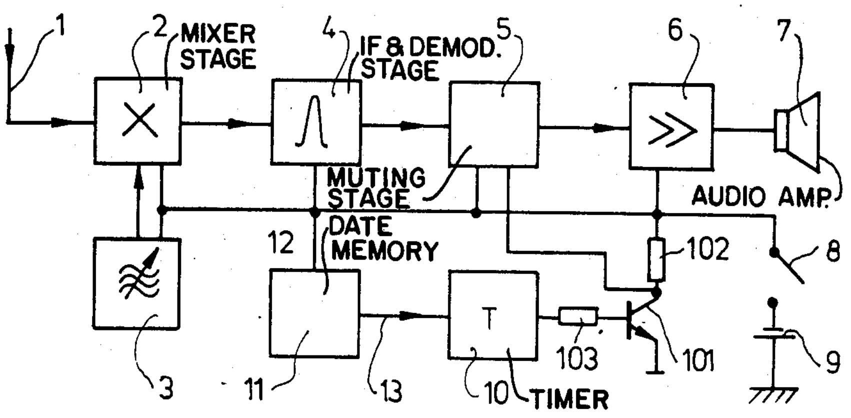
FIG. 1 shows a first embodiment of the invention.

FIG. 1 shows schematically the block diagram of a radio receiver comprising an aerial 1, a mixer stage 2, which mixes the aerial signal with the signal from a tunable oscillator, an IF and demodulator stage 4, a muting stage 5, by means of which the attenuation for the demodulated signal can be changed, an audio amplifier 6 and a loudspeaker 7. The apparatus is switched on in that the parts 2 to 6 are connected to a direct-voltage source 9 via a switch 8. The radio receiver is known so far.

In accordance with the invention the control input of the muting stage 5 is connected to the collector of a transistor 101, which is also connected to the power-supply line via a collector resistor 102. A resistor 103 connects the base of the transistor to the output of a timer 10, whose power-supply line is connected to the output of a date memory 11, whose input is also connected to the power-supply source 9 via the switch 8. The timer 10 is constructed so that it is set as soon as an operating voltage is applied. In the set condition it generates a direct voltage on its output, which voltage turns on the transistor 101, so that the stage 5 has a low attenuation. When a specific time interval, for example a few minutes determined by the timer 10, has elapsed, the timer 10 is reset, causing a direct voltage to appear on its output, by means of which direct voltage the attenuation of the stage 5 is switched over to a high value via the transistor 101.

The timer 10 may be constructed in a simple manner, preferably by means of an integrated circuit, for example of the type NE555, and may also comprise a suitable matching stage, which generates the voltages required for the correct operation of the muting stage.

Figure 2:
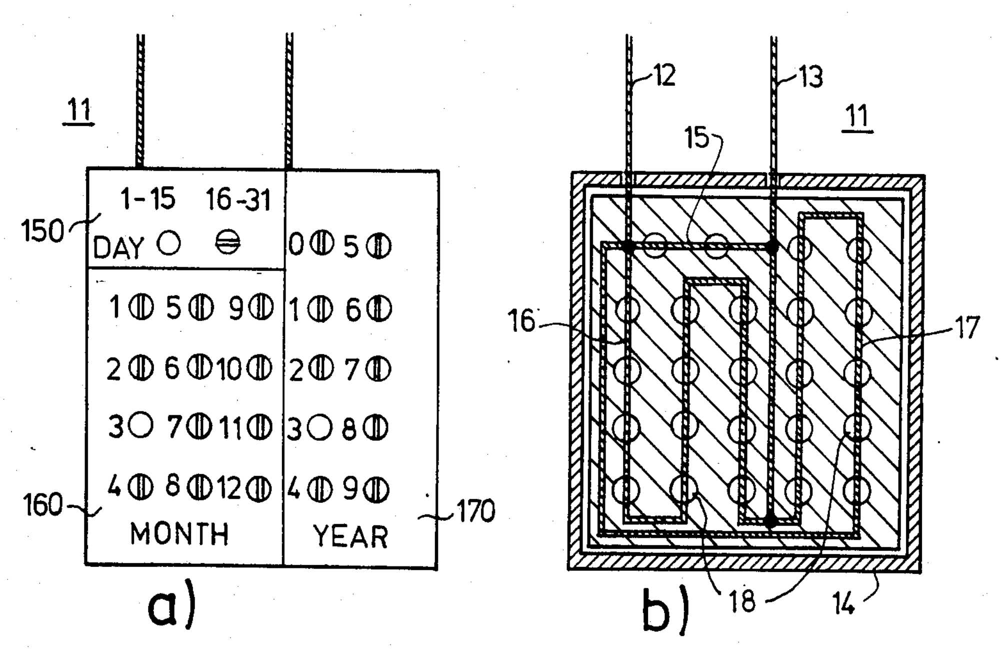
FIG. 2*a* shows the associated memory.
FIG. 2*b* shows the same memory with the cover removed.

The date memory 11 is shown in FIGS. 2*a* and 2*b*. It comprises a plastics board 14 to which input and output lines 12 and 13 are connected. These two lines are conductively connected to each other via three printed copper tracks 15, 16 and 17. The copper tracks extend across a plurality of holes 18 in the plastics board, in such a way that only one of the three lines extends across each hole. As can be seen in FIG. 2a, the plastics board is provided with a cover with a legend, which cover exposes the holes and is divided into three areas 150, 160 and 170. The area 150 which corresponds to the days of a month, contains the holes across which the copper track 15 extends, the area 160, which corresponds to the months, contains those across which the copper track 16 extends, and the area 170, which corresponds to the years, contains those across which the copper track 17 extends. When in each of the three areas a hole is pierced by means of a suitable object, for example a screwdriver, a specific date is stored (for example 05.03.1983 in FIG. 2a) and the electrical connection between the lines 12 and 13 is interrupted. When this memory is used, the receiver shown in FIG. 1 operates as follows: If the data memory has not been programmed as described above, the supply voltage is applied to the timer 10 via the input line 12 and the output line 13 when the receiver is switched on, after which the timer is set and transistor 101 is turned off. This causes a comparatively high voltage to appear on the collector of this transistor, so that the muting circuit is rendered inoperative, i.e. has a low attenuation. After the time set by means of the timer has elapsed, this timer changes over to the opposite state, causing transistor 101 to be turned on and the muting circuit 5 to be cut off, so that the loudspeaker 7 produces no sound. However, if the memory 11 has been programmed by severing the copper tracks at the location of the relevant holes in each of the areas 150, 160 and 170, the connection between the lines 12 and 13 is interrupted. The timer 10 then receives no supply voltage and transistor 101 is cut off, so that a voltage is applied to the control input of the muting circuit and this circuit is set to a low attenuation.

It is alternatively possible to connect the supply voltage input of the timer 10 directly to the switch 8 for the supply voltage and to connect the output of the timer 10 to the control input of the muting circuit via the memory 11, in which case the matching circuit 101 . . . 103 may be dispensed with.

Instead of the muting circuit the timer may be coupled to a stand-by circuit by means of which sound reproduction can be discontinued. Alternatively, it is possible to disconnect the power supply voltage from the audio channel via the timer 10 or the memory 11. In all these cases it is essential only that there is a stage whose attenuation or gain can be set from a low to a high value by means of a control voltage.

FIG. 1 shows the invention applied to a radio receiver. In a similar way it may be employed in other equipment comprising an audio channel, for example a record player, a recorder or a television receiver. In a television receiver it is also (or alternatively) possible to control the video channel in a similar way.

Figure 3:
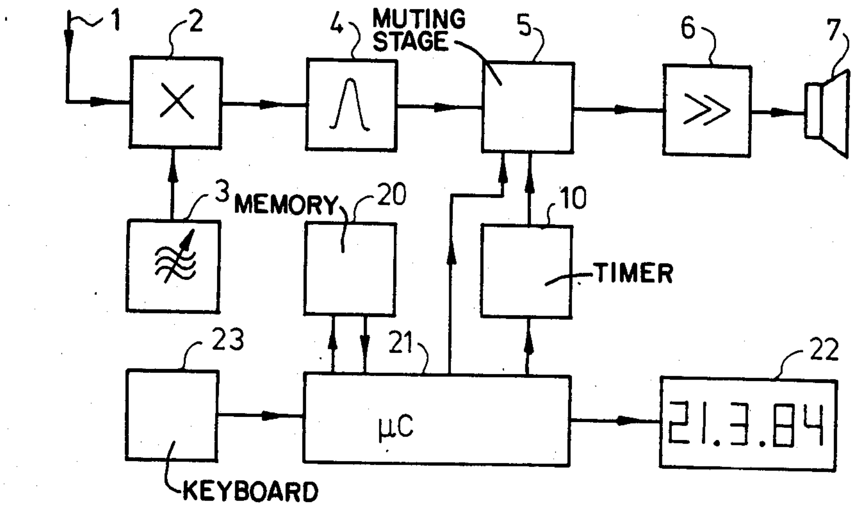
FIG. 3 shows an embodiment comprising a microcomputer.

FIG. 3 shows the block diagram of a radio receiver in accordance with the invention in which the receiver is controlled by a control device in the form of a microcomputer 21. The muting stage 5, or a stage whose attenuation can be controlled by means of a direct voltage, is connected to the output of the timer 10 and to an output of the microcomputer 21. The microcomputer is connected to a non-volatile digital memory, for example of the EAROM-type, in which the date of putting into operation can be stored with the aid of a keyboard 23 via the microcomputer. The microcomputer also controls the display 22 by means of which inter alia the memory contents 20 can be displayed.

Figure 4:
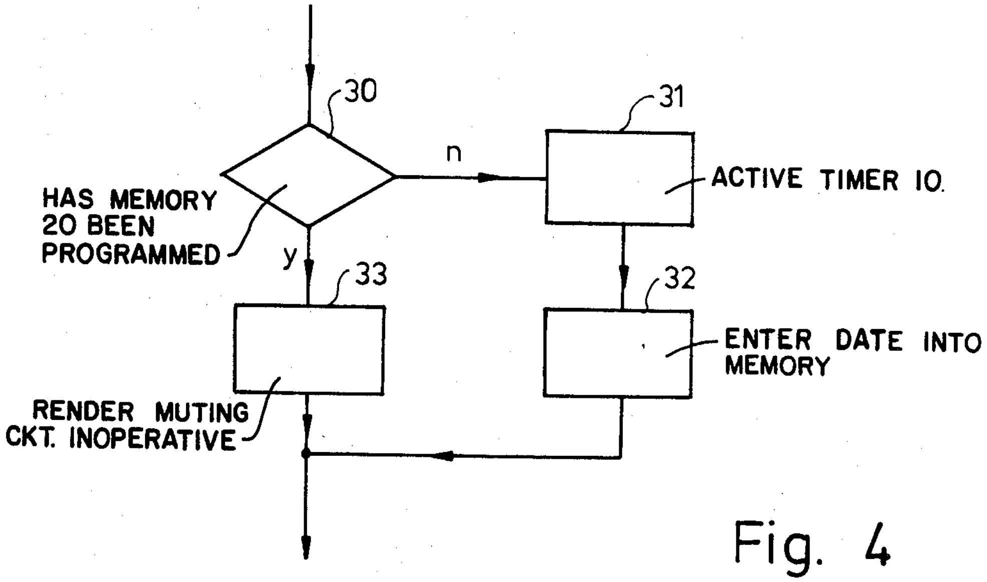
FIG. 4 is a flow chart of a part of the program for this microcomputer.

How the microcomputer cooperates with the devices 5, 10, 20, 22 and 23 follows from the flow-chart of a part of the program shown in FIG. 4, which program is performed each time that the power-supply voltage is switched on and each time that an entry destined for the memory 20 is keyed in. In interrogation block 30 it is ascertained whether the memory 20 has been programmed or not, i.e. whether its contents differs from zero. If this is not the case, the program branches to block 31, causing the timer 10 to be activated, so that after a predetermined time interval has elapsed the sound reproduction is muted. Moreover, the user is instructed to enter the date into the memory (block 32) in a suitable manner, for example by blinking of the display 22 or by a beep tone.

However, if the contents of the memory 20 is not zero, i.e. if the memory has been programmed, the program proceeds to block 33, in which the muting circuit 5 is rendered inoperative (low attenuation) and the microcomputer 21 enters no further dates into the memory 20. This is in order to prevent a date which has already been entered from being altered, which in principle is possible in the case of memories of the EAROM-type. This step is not necessary if instead a memory of the PROM type is used, but this demands the use of a suitable interface for programming such a memory.

If it is taken into account that in a receiver controlled by a microcomputer the devices 21, 22 and 23, and generally also the memory 20, are needed anyway for other control purposes, it will be evident that the additional cost for the invention mainly resides in the timer 10 and in the change of the microcomputer program as shown in FIG. 4. If desired, the timer function may also be carried out by the microcomputer.

What is claimed is:

1. In a circuit arrangement for an apparatus having a power supply and at least one signal channel, the circuit arrangement comprising:

a muting stage for increasing signal attenuation for the channel;

a non-volatile data memory working cooperatively with the muting stage, the memory being programmable by an user of the apparatus;

a timer coupled to the memory, the timer being set by switching on the power supply;

wherein the memory and the timer affect the muting stage to increase the signal attenuation after a timer defined time interval has elapsed if the memory has not been programmed; and wherein the muting stage is not affected by the timer if the memory has been programmed.

2. A circuit arrangement as claimed in claim 1, wherein the data memory comprises:

input and output terminals respectively coupling the memory to the power supply and the timer, the terminals being interconnected by at least one conductor arranged on a board formed with a plurality of holes at different locations superposing the conductor, wherein said conductor is severed by piercing some of the superposed holes, and the holes correspond to different dates.

3. A circuit arrangement as claimed in claim 2, wherein the timer controls the muting stage and is connected to the power supply by the date memory.

4. A circuit arrangement as claimed in claim 2, wherein the timer is connected to the muting stage by the date memory.

5. A circuit arrangement as claimed in claim 1, wherein the data memory is an electrical non-volatile digital memory connected to a control means working cooperatively with the timer, the memory being programmable by an input means connected to and acting through the control means, said timer being set when the power supply is switched on if said memory has not been programmed; and the timer effects an increase in the attenuation of the muting stage when a predetermined time interval has elapsed.

* * * * *